Figure 1:
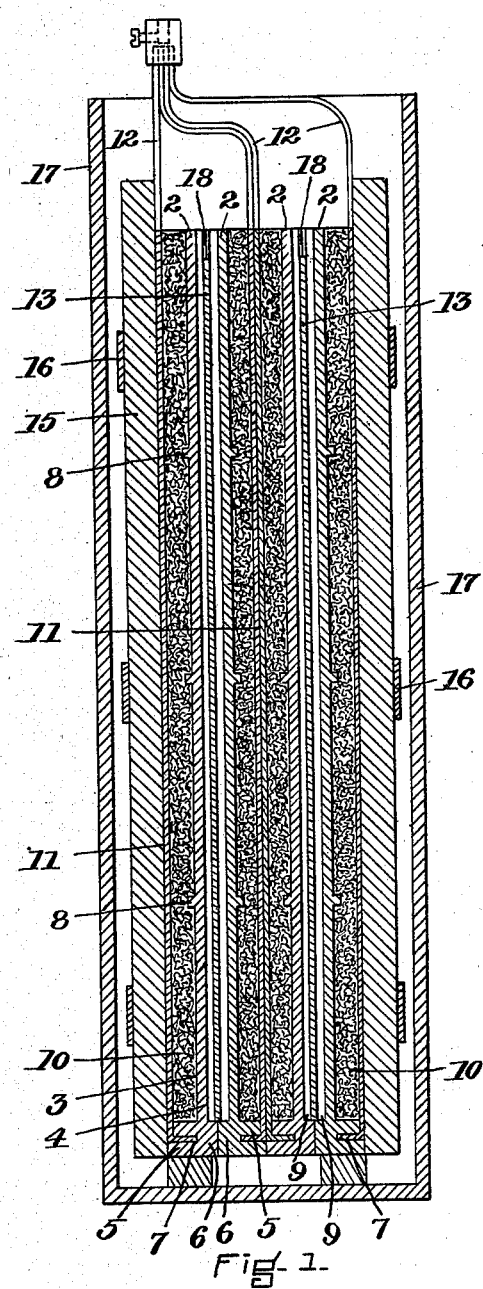

No. 736,420. PATENTED AUG. 18, 1903.
J. MIDDLEBY, Jr.
SECONDARY BATTERY.
APPLICATION FILED NOV. 22, 1899.
NO MODEL. 2 SHEETS—SHEET 1.

WITNESSES.
A. D. Grover.
Fred E. Dorr

INVENTOR.
Joseph Middleby, Jr.
by his attorney
E. D. Chadwick.

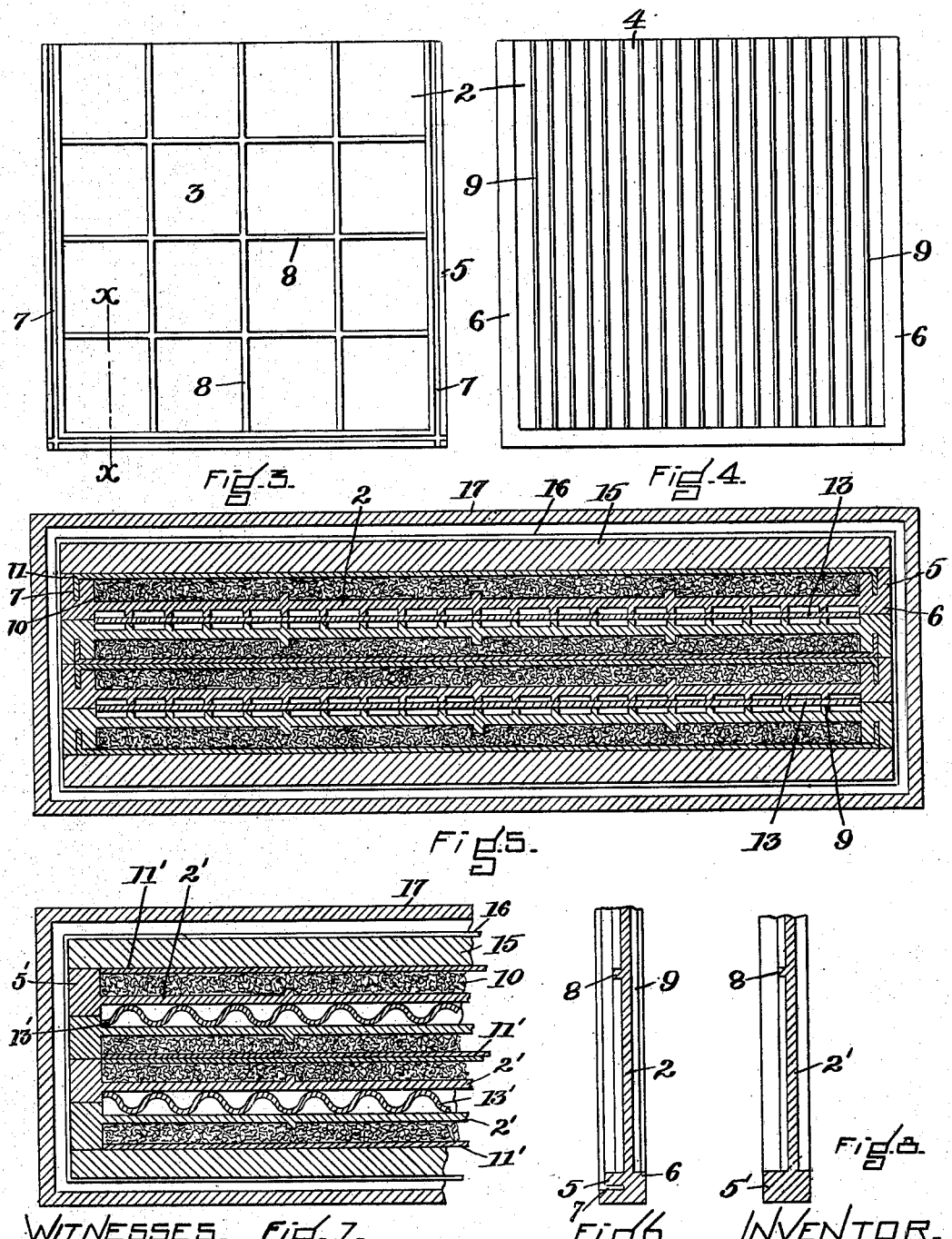

No. 736,420. Patented August 18, 1903.

UNITED STATES PATENT OFFICE.

JOSEPH MIDDLEBY, JR., OF MALDEN, MASSACHUSETTS, ASSIGNOR, BY DIRECT AND MESNE ASSIGNMENTS, TO THE HATCH ACCUMULATOR COMPANY, OF KITTERY, MAINE, AND BOSTON, MASSACHUSETTS, A CORPORATION OF MAINE.

SECONDARY BATTERY.

SPECIFICATION forming part of Letters Patent No. 736,420, dated August 18, 1903.

Application filed November 22, 1899. Serial No. 737,886. (No model.)

*To all whom it may concern:*

Be it known that I, JOSEPH MIDDLEBY, Jr., a citizen of the United States, residing at Malden, in the county of Middlesex and State of Massachusetts, have invented certain new and useful Improvements in Secondary Batteries, of which the following is a specification.

My invention is intended to provide an improved secondary or storage battery in which negative-pole electrodes of metallic zinc may be used in combination with lead or other positive-pole electrodes and which shall possess certain other advantageous features hereinafter set forth.

It has heretofore been proposed to use zinc as a material for the negative-pole electrodes of a secondary battery, and it has been found that the combination of such electrodes with positive-pole electrodes of lead has the advantage that it will yield a considerably higher voltage per couple than can be obtained from the usual combination of lead electrodes only, while it will also effect a substantial reduction in the weight of the cell; but so far as I am aware all lead-zinc secondary batteries hitherto invented have been impractical by reason of various defects, particularly a lack of compactness, a tendency to the waste and speedy destruction of the zinc electrodes, and to the formation of growths of electrically-deposited zinc or "zinc trees," so called, extending from the zinc electrodes to the positive-pole electrodes, and thereby short-circuiting the battery and making it incapable of retaining its charge for any considerable length of time.

A main object of my invention is therefore to provide a secondary battery in which negative-pole electrodes of metallic zinc may be employed without being subject to the objections above noted, to which end I interpose between the alternating, positive, and negative electrodes of my battery a porous separator so constructed as to envelop and inclose one or both of the adjacent electrodes in such manner as to prevent any possibility of a growth of deposited metal from one electrode to another, but without injuriously interfering with the passage of the electric current or the circulation of the electrolyte. I also preserve the integrity of the zinc electrodes by so protecting certain portions thereof that no substantial quantity of metallic zinc will either be dissolved from such portions during discharge or deposited thereon during recharge, thereby confining the chemical action on those electrodes to certain definite and restricted areas thereof and concentrating such action thereon. In this manner the chemical action is made practically uniform over the exposed areas during both discharge and recharge, while a conducting and strengthening framework permanently connecting such areas is preserved.

A secondary battery embodying a preferred form of my invention is illustrated in the accompanying drawings, in which—

Figure 2:
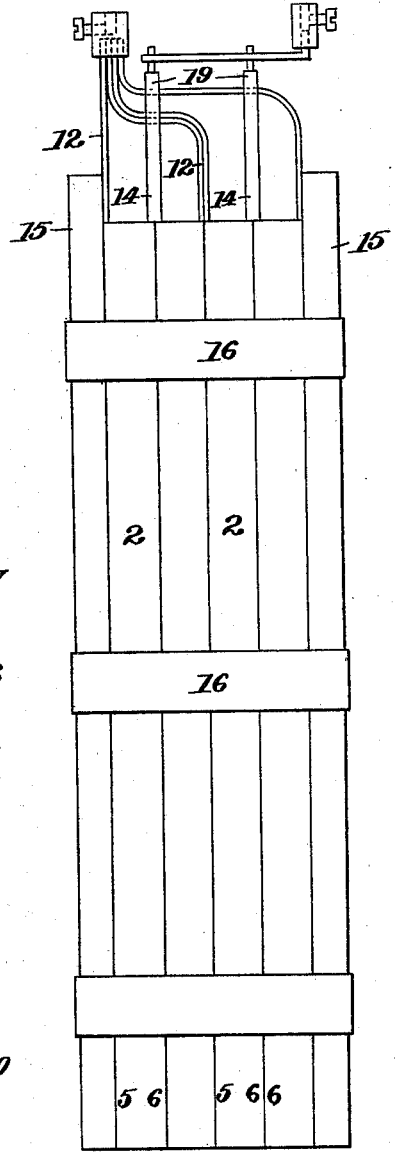

Figure 1 is a vertical transverse section through a complete cell containing two pairs of electrodes. Fig. 2 is an end view of the element removed from its jar. Figs. 3 and 4 are views, on a reduced scale, of the opposite faces of a porous separator hereinafter described. Fig. 5 is a horizontal section through the cell shown in Fig. 1. Fig. 6 is a detail section on the line $x\,x$ in Fig. 3. Fig. 7 is a fragmentary section similar to Fig. 5, but illustrating a modified construction. Fig. 8 is a detail section similar to Fig. 6, illustrating a modified form of separator shown in Fig. 7.

In the drawings, 2 represents a thin flat porous plate, which is best made of unglazed pottery and is provided on its faces 3 and 4 with integral raised edges 5 and 6, extending around three of its sides, but omitted from that side which is to be located at the top of the cell when assembled, thus forming what may be called a "double half vessel," so that when two of the plates 2 are placed on their bottom edges with their like faces opposed to each other and their raised edges in contact they will form a complete porous vessel open at its top only and adapted to receive and inclose an electrode within it. The raised edges 5 are given such width that grooves 7 may be formed therein, one in each edge, as shown, and a few intersecting ribs 8 may be formed on the flat face 3 in order to strengthen the same. The raised edges 6 are not grooved, and the corresponding face 4 of the plate 2 is provided with a number of parallel ribs 9, somewhat less in height than the edges 6 and preferably so arranged that they will be vertical when the cell is set up.

To construct a cell such as shown in the drawings, I take one of the half vessels above described and apply to its face 3 a quantity of red lead or other suitable active material 10, made into a paste in a manner well known in the art, enough of this material being used to cover the face 3 up to the level of the top of the inner portions of the edges 5. Ordinarily this layer of active material will be about three-sixteenths of an inch in thickness. A cover 11, of thin sheet-lead, is then laid upon the active material 10, and its edges are turned down into the grooves 7, said active material being thus completely confined within the vessel formed by the plate 2 and its raised edges 5. The function of the lead cover 11 is to conduct the electric current to and from the active material, and since it does not have to support any part of the weight of said active material it may be made very thin and light. At its top, preferably on one side, a strip 12 is left projecting upward, which when the cell is assembled is joined to the corresponding strips on the other lead sheets to form one terminal of the cell. Any desired number of filled plates prepared as above described are then placed one against the other with their loaded sides face to face, thus bringing the lead covers 11 into contact with each other in pairs, except at the end faces of the cell, as shown in Figs. 1 and 5, thereby forming the positive-pole electrodes of the cell and leaving a series of empty vessels each formed by the faces 4 and edges 6 of a pair of plates and alternating with the pairs of lead covers 11. In each of these vessels is placed a negative-pole electrode 13, which, as shown in Figs. 1 and 5, consists of a flat plate of metallic zinc cut to lie within the raised edges 6 and of such thickness as to have a close but not a binding fit between the opposed ribs 9. A lug 14 projects from the top of each plate 13, all of which lugs are suitably connected to one another, as shown in Fig. 2, to form one terminal of the cell. The zinc electrodes should be thoroughly amalgamated before they are combined with the other parts of the cell. When thus assembled, the parts of the cell may be held together by means of backs 15, of glass, slate, paraffined wood, or other suitable acid-proof material, placed against the opposite faces of the element and held thereto by rubber bands 16, passed around the element, which is supported in any suitable jar 17 containing the electrolyte.

It will be seen that in a cell constructed as above described each electrode will be completely inclosed, except at its top edge, by a porous vessel, and hence no formations of deposited zinc can possibly extend from one electrode to any other across the three inclosed edges, while the electrolyte will have sufficient access to all the electrodes through the open tops of the porous vessels, the cracks which will exist at the meeting edges thereof, the spaces between the ribs 9, and the pores of the plates 2. If desired, the raised edges 5 and 6 may be carried across the tops of the plates 2, leaving merely sufficient space for the lugs 12 and 14; but I have found that the formation of zinc trees at the top of the cell will be sufficiently provided against by causing the plates 2 to extend slightly above the tops of the zinc electrodes, as shown at 18 in Fig. 1, or, if desired, above both electrodes and out of the electrolyte, and hence I prefer to leave the porous vessels open at the top of the cell, whereby and by making the ribs 9 vertical I provide for the ready escape of the gases generated during the charge and discharge of the cell. On each zinc electrode those areas which are in contact with the ribs 9 will be protected from the action of the electrolyte, which action will therefore be confined to the areas exposed to the electrolyte between said ribs and will be concentrated thereon, thus making the dissolution and deposition of the zinc practically uniform on such areas, while the form and integrity of the electrode as a whole will be preserved by the series of protected areas. I have found that in this manner the lives of zinc electrodes may be greatly prolonged, and it is one of the advantages of the cell above described that in case it becomes necessary to renew said electrodes this may be done without taking the entire cell apart by simply disconnecting the used zinc plates from their terminal post, lifting them from their respective vessels, and inserting fresh ones. When an electrode is thus removed, the meeting edges of the plates 2 will prevent the element from collapsing under the pressure of the rubber bands 16, while said bands will yield sufficiently to permit the easy withdrawal of such electrode and the insertion of a new one in case it tends to make too tight a fit with the ribs 9.

A further advantage gained by my cell is found in its obvious compactness, which, in connection with the relative lightness of the zinc electrodes and the increased voltage obtainable therefrom, secures a cell of minimum size and weight in proportion to its capacity. It will be seen also that the porous plates 2 not only serve as vessel-supports for the active material of the positive-pole electrodes and completely inclose the same and protect it from disintegration and short-circuiting, but also form interposed porous vessels for the reception of the negative-pole electrodes and give the desired form and rigidity to the element regardless of the shape, size, or rigidity of said negative-pole electrodes, and hence it is possible to make the latter removable, as previously stated. It will be evident that lead or other negative-pole electrodes may be substituted for the zinc plates herein described, if desired.

I prefer to use as the electrolyte for my battery a solution composed of pure water to which has been added, in the order stated, about one-twentieth of its volume of chemically-pure sulfuric acid, sulfate of mercury slightly in excess of what will be dissolved by the hot mixture, and carbonate of ammonia in the proportion of from two to four ounces to each gallon of the mixed water and acid. Such an electrolyte will practically prevent local action on the submerged zinc electrodes; but I have found that the lugs 14, projecting above the surface of the electrolyte, are attacked in the presence of air by the spatterings of electrolyte thrown upon them by the gases escaping from the cell when in use, and in order to prevent such action I protect said lugs preferably by slipping a rubber tube 19 over each of them, so that it will extend upward from the top of the zinc plate to a point beyond the reach of the spatterings.

I do not consider my invention to be limited to the precise manner above described of protecting portions of the zinc electrodes, as so far as I am aware the idea of prolonging the life of a zinc electrode by concentrating the electrochemical action thereon upon certain limited areas thereof, and thereby making such action uniform, is broadly new. It will be apparent also that the formation of zinc trees may be prevented by inclosing one only of each pair of electrodes within a porous vessel instead of both and that said vessels may be otherwise modified in many particulars without departing from my invention. For example, I have shown in Figs. 7 and 8 a modification in which the raised edges 5' of the plates 2' have no grooves, the lead covers 11' being simply fitted between said raised edges and laid against the active material. The ribs 9 also are omitted from said plates 2', and the zinc electrodes 13' are corrugated sufficiently to come into contact with the adjacent smooth faces of said plates, the protected areas being formed by the lines of contact and spaces for the circulation of the electrolyte being provided by the corrugations in the electrodes themselves.

I claim as my invention—

1. A separator for the electrodes of secondary batteries consisting of a rigid porous plate provided on one side with a series of ribs, and with integral raised side and bottom edges extending above its body portion and ribs and adapted to be confined in contact with the edges of an opposed plate, substantially as described.

2. In a secondary battery, the combination of a series of rigid porous plates each provided with integral raised side and bottom edges and confined in contact with each other at said edges only, thereby forming a series of porous vessels, having an unrestricted opening at their respective tops, the opposed faces of said plates in alternate vessels being provided with ribs, substantially as described.

3. In a secondary battery, the combination of a series of rigid, porous plates each provided with integral raised side and bottom edges confined in contact with the edges of the opposed plates, thereby forming a series of vessels, each plate being loaded on one side with active material and so arranged that alternate vessels are filled with said active material, a conducting-plate inclosed by each body of active material, and a negative-pole electrode located between the unloaded faces of each pair of porous plates, spaces being provided between said negative-pole electrodes and plates, substantially as described.

4. In a secondary battery, an electrode comprising a porous plate provided with raised edges and loaded between said edges with active material, and a cover of sheet-lead laid against said active material and forming a conductor therefor, the edges of said lead cover being extended beyond the body of active material and turned downward.

5. In a secondary battery, an electrode comprising a porous plate provided with grooved raised edges and loaded between said edges with active material, and a cover of sheet-lead laid against said active material and forming a conductor therefor, the edges of said lead cover being inserted in said grooves.

6. In a secondary battery, the combination with a zinc plate forming an electrode, of a series of ribs or strips of chemically-inert material spaced apart and confined in contact with portions of the faces of said plate, for the purpose set forth.

7. In a secondary battery, the combination with a pair of porous plates provided on their opposed faces with a series of ribs, of a zinc plate held between said porous plates in contact with said ribs.

8. In a secondary battery, the combination of a pair of porous plates each provided on one face with a series of ribs and with raised edges confined in contact with the corresponding edges on the opposed plate, thereby forming a vessel, and an electrode of zinc contained in said vessel in contact with said ribs, for the purpose set forth.

9. A secondary battery comprising, in combination, a series of porous plates each provided on both faces with raised side and bottom edges confined in contact with the corresponding edges on the opposed plates, thereby forming a series of vessels, having an unrestricted opening at their respective tops, rubber bands surrounding said assembled plates, and an electrode contained within each of said vessels, substantially as described.

10. A secondary battery comprising, in combination, a series of porous plates each provided on both faces with raised edges confined in contact with the corresponding edges on the opposed plates, thereby forming a series of vessels, each plate being loaded on one side with active material and provided on its opposite side with a series of ribs, a conducting-terminal of sheet-lead laid on each body of active material, and a negative-pole electrode removably held between the ribbed faces of each pair of plates and in contact with said ribs, substantially as described.

In testimony whereof I have hereunto subscribed my name this 16th day of November, 1899.

JOSEPH MIDDLEBY, Jr.

Witnesses:
GEO. E. HATCH,
E. D. CHADWICK.